UNITED STATES PATENT OFFICE.

JÜRGEN CALLSEN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

SANTALOL ETHER.

No. 909,541.      Specification of Letters Patent.      Patented Jan. 12, 1909.

Application filed March 3, 1908. Serial No. 418,958. (Specimens.)

*To all whom it may concern:*

Be it known that I, JÜRGEN CALLSEN, doctor of philosophy, chemist, citizen of the German Empire, residing at Elberfeld, Germany, Kingdom of Prussia, have invented new and useful Improvements in Santalol Ether, of which the following is a specification.

My invention relates to the production of new pharmaceutical products, which are chemically ethers of santalol from oil of santal and which according to my researches possess valuable therapeutic properties, being useful substitutes for santalol without the intense and disagreeable taste and the irritating symptoms caused by this compound. They are especially qualified for the treatment of gonorrhea, cystitis, etc., an average dose being between from 0.2 to 0.5 grams.

The process for producing the new compounds consists in treating santalychlorid with sodium alcoholates, such as sodium methylate, sodium ethylate, sodium phenolate, the sodium compound of menthol, etc. or by alkylating santalol. The new products thus produced are limpid liquids which are soluble in alcohol and ether and are insoluble in water. They are dissolved by concentrated sulfuric acid with a reddish-brown color. On heating santalol-ethers with hydroiodic acid, santalyliodid and the corresponding alkyliodids are formed, but since santalyliodid is quickly decomposed, splitting off hydroiodic acid, the hydrocarbon santalene is the final product of the reaction.

In carrying out my process practically I can proceed as follows. the parts being by weight: 215 parts of finely powdered phosphorus pentachlorid, contained in a flask, are covered with ligroin and to this a solution of 220 parts of santalol dissolved in 220-250 parts of ligroin is added through a dropping funnel, the flask being cooled and shaken. The reaction begins at once. When the evolution of hydrochloric acid gas has ceased, the undissolved phosphorus pentachlorid is filtered off and the filtrate is washed until it shows a neutral reaction. The ligroin is then driven off and the residue is distilled *in vacuo*. The portion distilling from 162–167° under a pressure of 115 mm. is the santalylchlorid. 250 parts of santalylchlorid are boiled in a vessel connected with a reflux condenser for 12 hours with a solution of 30 parts of sodium in methyl alcohol. The methyl alcohol is distilled off, the residue is dissolved in ether, the ethereal solution is washed with water containing a small quantity of an acid and then with water until it no longer shows an acid reaction. The ethereal solution is then dried over anhydrous sulfate of sodium, the ether is driven off and the residue is distilled *in vacuo*. The new methyl ether of santalol thus obtained is a limpid oil which boils at 149–156 centigrade under a pressure of about 166 mm. It is easily soluble in alcohol, benzine, chloroform and ether and is insoluble in water. The new compound dissolves in concentrated sulfuric acid with a reddish-brown color. It is decomposed by heating it with hydroiodic acid, santalyl iodid and methyliodid being obtained. Santalyliodid however splits off hydroiodic acid again, and is quickly converted into santalene. The formation of the new methylether of santalol takes place probably according to the following formula:

$$C_{15}H_{23}.Cl + NaOCH_3 = ClNa + C_{15}H_{23}.OCH_3.$$

The process is carried out in an analogous manner by using other sodium alcoholates. The ethyl ether of santalol is a limpid oil boiling at 169–175° centigrade under a pressure of about 22 mm. and has the formula:

$$C_{15}H_{23}.OC_2H_5.$$

The phenyl ether of santalol obtainable from santalyl-chlorid and sodium phenolate is a limpid oil boiling at 232–241° centigrade under a pressure of about 20 mm. and has the formula:

$$C_{15}H_{23}.OC_6H_5.$$

The menthyl ether of santalol obtainable from santalylchlorid and the sodium compound of menthol is a limpid oil boiling at 201–210° centigrade under a pressure of about 5 millimeters and has the formula:

$$C_{15}H_{23}.OC_{10}H_{19}.$$

Having now described my invention and in what manner the same is to be performed, what I claim as new, and desire to secure by Letters Patent is:—

1. The herein-described new ethers of santalol, obtainable by treating santalyl chlorid with sodium alcoholates, which are limpid liquids soluble in ether and in alcohol, insoluble in water and soluble in concentrated sulfuric acid with a reddish-brown color, on heating with hydroiodic acid they form santaliodid, which, however, is quickly decomposed into santalene; and exhibiting valuable therapeutic properties, substantially as hereinbefore described.

2. The herein-described new methyl-ether of santalol, being a valuable remedy, obtainable by the action of sodium methylate upon santalyl-chlorid, which is a limpid colorless oil being almost tasteless; boiling at 149-156° centigrade under a pressure of about 166 mm., soluble in alcohol and ether, soluble in concentrated sulfuric acid with a reddish-brown color and insoluble in water; and which by heating with hydroiodic acid is decomposed into santalyl iodid santalene being finally formed from santalyl iodid and methyl iodid, substantially as hereinbefore described.

In testimony whereof I have hereunto set my hand in the presence of two subscribing witnesses.

JÜRGEN CALLSEN. [L. S.]

Witnesses:
OTTO KÖNIG,
WM. WASHINGTON BRUNSWICK.